Jan. 3, 1950 J. U. DEVINE ET AL 2,493,061
HYDRAULIC PIPE TESTING MACHINE
Filed July 23, 1946 2 Sheets-Sheet 1
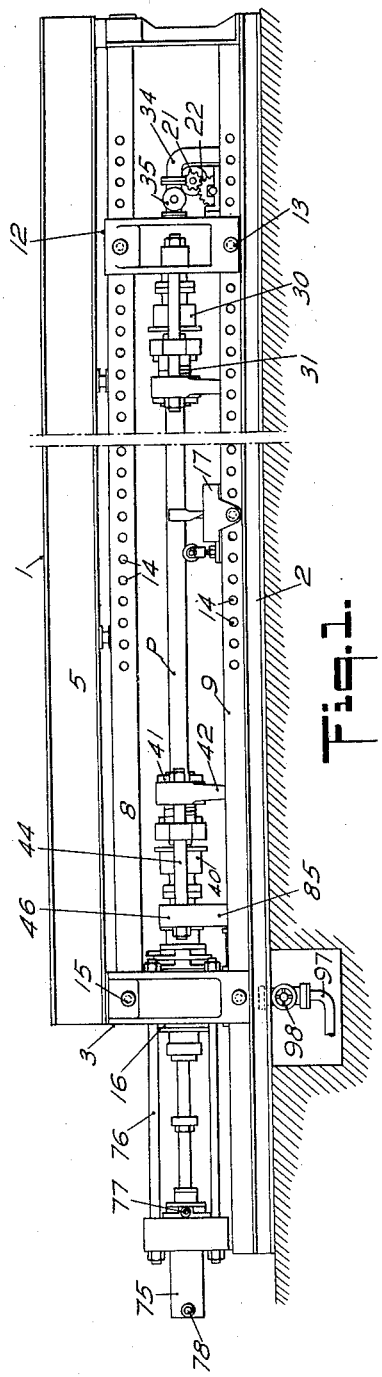
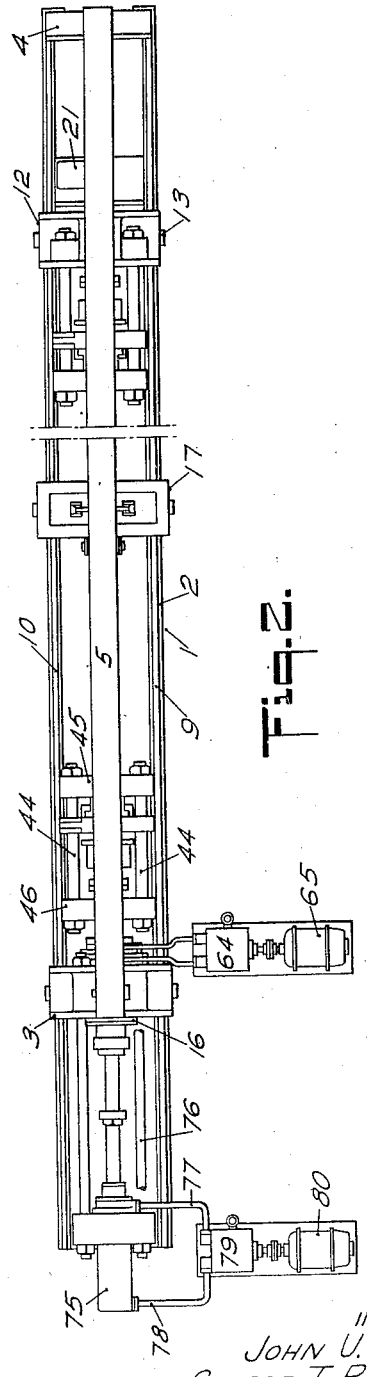
INVENTORS
JOHN U. DEVINE
GEORGE T. RADFORD &
MARTIN S. GETTIG
BY
ATTORNEY

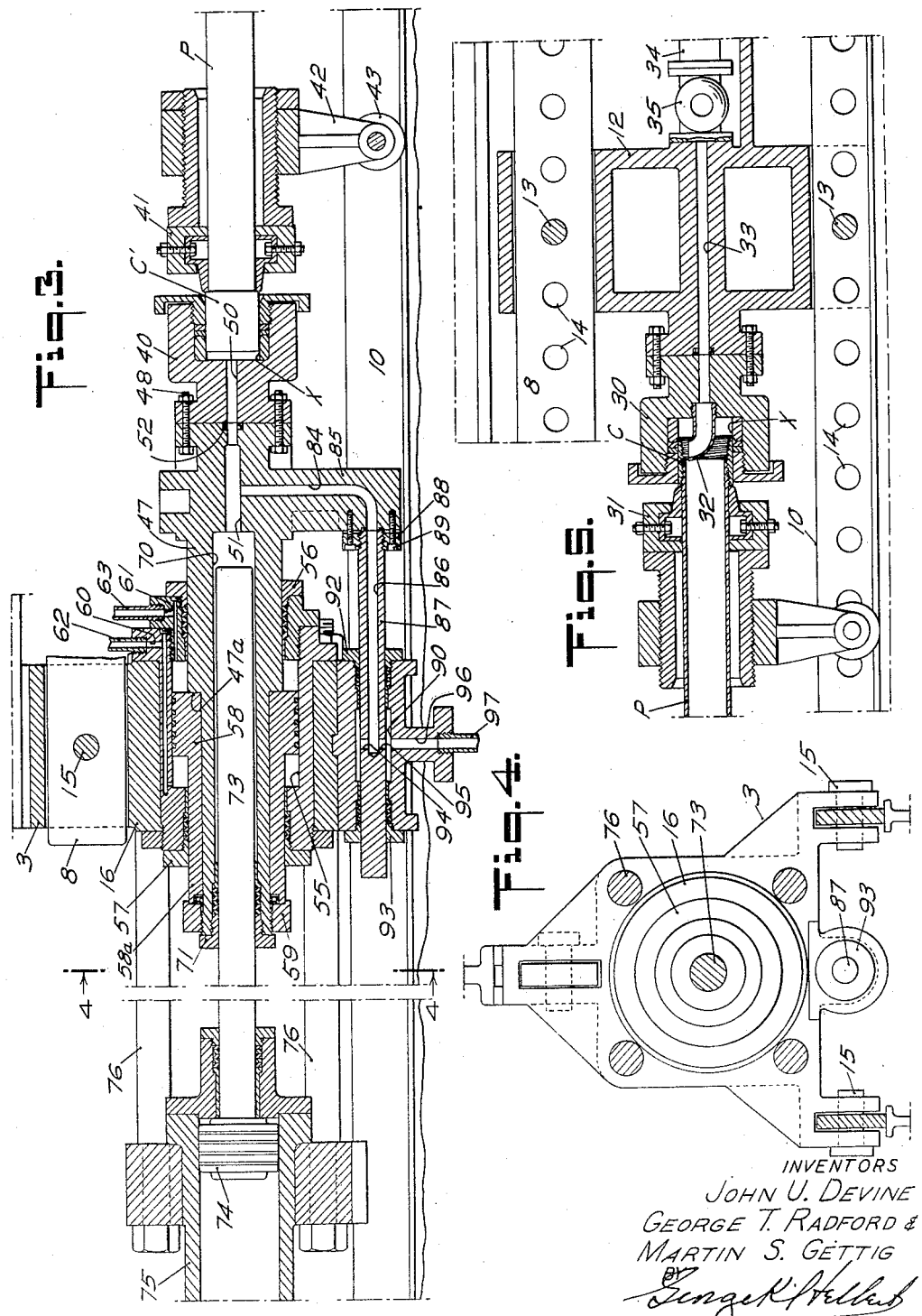

Patented Jan. 3, 1950

2,493,061

UNITED STATES PATENT OFFICE 2,493,061

HYDRAULIC PIPE TESTING MACHINE

John U. Devine, Struthers, George T. Radford, Youngstown, and Martin S. Gettig, Poland, Ohio Application July 23, 1946, Serial No. 685,710

9 Claims. (Cl. 73—37)

This invention relates to the testing of pipe, particularly oil country pipe which because of the sinking of increasingly deeper wells is now subjected in use to more severe stresses than heretofore and must be capable of withstanding materially higher internal pressures than were formerly considered likely to be encountered.

It has thus become necessary to develop means for subjecting such pipe during testing and before delivery for use to internal pressures of the order of 6000 to 10,000 lbs. per square inch to afford to the manufacturer adequate test data on the basis of which to represent his product as conforming to specifications prescribed by purchasers.

One form of apparatus developed for this purpose comprises a test bench having a pair of aligned heads, each capable of receiving an end of the pipe to be tested and making therewith a water-tight joint, together with means for filling the pipe, usually through a passage in one of the heads, with a test fluid such as water and for then raising its pressure in the pipe to a desired value. An oil-water interchanger or pressure intensifier is usually provided for effecting this increase in the water pressure, being connected with one of the heads by suitable piping which must be extremely heavy to withstand the very high testing pressures.

Further, and again largely because of increasing depths of oil wells, the manufacturer may desire to test pipe at such pressures while it is also under longitudinal tension or longitudinal compression as well as when under no material longitudinal stress, although we know of no apparatus prior to our invention capable of subjecting pipe to longitudinal tension or compression concurrently with internal pressures of the order of those mentioned.

It is therefore an object of our invention to provide improved apparatus for testing pipe or generally similar tubular articles which is devoid of an elaborate system of piping for carrying the testing fluid under the extremely high testing pressures required and in which tests may be made selectively while the pipe is under longitudinal tension, longitudinal compression, or neither and so in substantially neutral condition as regards longitudinal stress.

A further object is to provide an hydraulic pipe testing machine having a movable gland head receiving one end of the pipe to be tested which, after having been engaged with, and secured in fluid tight relation to, said end may be selectively urged in opposite directions relatively to the other fixed end of the pipe to subject the latter to longitudinal tension or compression during the exertion of internal pressure by fluid introduced thereinto.

A still further object is to provide a machine of this character in which a test fluid such as water, after being introduced into a pipe positioned in the testing bench of the machine, may be subjected to extreme pressure by operation of means incorporated in the bench itself, whereby the necessity for employment of high pressure pipe connections, between the testing machine and more or less remote pressure generating or intensifying mechanism is avoided.

Other objects, purposes and advantages of the invention will hereinafter more fully appear or be understood from the following description of a preferred embodiment of it shown in the accompanying drawings, in which:

Fig. 1 is a side elevation of the main components of the machine, certain pumps, connections therefor and the like normally associated with the testing bench being omitted for clearness of illustration;

Fig. 2 is a top plan view of Fig. 1, in which certain of said pumps and connections also are diagrammatically illustrated;

Fig. 3 is an enlarged fragmentary vertical section on the longitudinal center line of the testing bench shown in the preceding figures;

Fig. 4 is a fragmentary transverse vertical section on a plane corresponding to the line 4—4 in Fig. 3; and Fig. 5 is a fragmentary section similar to Fig. 3 but showing mechanism adjacent the opposite end of the bench.

In the several figures like characters are used to designate the same parts.

Referring now more particularly to the drawings and initially to Figs. 1 and 2 therein, the testing bench 1 of the machine comprises in general a pair of longitudinally extending rails 2—2 disposed on a suitable foundation or base and fixed vertical end frames 3, 4 interconnected by a beam 5 supporting a tie rod 8 just below the beam, with similar tie rods 9, 10 supported on rails 2—2. A movable test head assembly 12, hereafter more fully described, is carried on rollers (not shown) engaging the rails 2—2 as is customary for corresponding assemblies in benches of the type heretofore known and is held in longitudinally fixed position adjacent one end of the bench through the medium of removable bolts 13 received in any of a series of holes 14 in each of the tie rods. Adjacent the opposite end of the bench, preferably forming a part of end frame 3 and connected to tie rods 8, 9 and 10 through additional bolts 15 is a relatively fixed head assembly 16 which, as will hereafter more fully appear, is directly instrumental in applying both internal pressure and, if desired, either longitudinal tension or compression to the pipe P being tested. When in position in the machine the pipe P is preferably supported intermediate its ends on a plurality of clamps 17, of which but one is indicated in the drawings since they may be of any suitable character and form no part of the invention, the number of clamps employed being a matter of choice depending somewhat on the length of the pipe.

The movable test head assembly 12 when bolts 13 are removed can be positioned at any point longitudinally of the bench as required by the length of the pipe to be tested, a motor 21 driving a gear train 22 connected by mechanism (not shown) with the rollers supporting the head being provided for moving it; bolts 13 of course are replaced after the head has been shifted to proper position. The fixed head assembly 16 at the other end of the machine, however, is devoid of capacity for longitudinal adjustment in this way, but has capacity for compensating for minor differences in pipe lengths, such as differences less than the distance between adjacent bolt holes 14.

The specific structure of the movable head assembly 12 constitutes no part of the invention as any mechanism suitable for performing its functions may be used, and as typical we have therefore illustrated, particularly in Fig. 5, an assembly comprising a pipe receiving gland head 30, an adjustable clamp 31 operable to engage pipe P and coupling C threaded in its end to hold it in the gland and a fluid outlet fitting 32 within the gland cavity and connecting through a passage 33 in the head with an exhaust pipe 34 controlled by a valve 35, although if preferred other means may be provided affording a pressure containing stop or closure and a fixed support for one end of pipe P, with a valve controlled outlet for escape of air while the pipe is being filled with testing fluid.

The fixed head assembly 16 at the opposite end of the bench comprises somewhat similar pipe clamping and sealing means for the other end of the pipe P with its attached coupling C' including a gland head 40 and adjustable clamp 41 which is movable to a limited extent along rails 2 on legs 42 provided with rollers 43. Clamp 41 is maintained in fixed relation to the gland head by the rods 44 (Figs. 1 and 2) extending through lugs 45 projecting laterally from the clamp body and similar lugs 46 on a plunger 47 axially slidable in the head assembly 16 and to which gland head 40 is attached by bolts 48. For admitting testing fluid to the pipe when in position for a test, gland head 40 has an axial passage 50 communicating with a passage 51 in the plunger 47, a gasket 52 sealing the joint between these parts at the junction of the two passages.

The assembly 16 includes a horizontally disposed cylinder 55 with glands 56 and 57 sealing its ends in fluid tight relation with plunger 47. Within the cylinder is a piston 58 fixed to the plunger through the medium of a threaded collar 59 which engages one end of a sleeve 58a integral with the piston and projects outside the cylinder through gland 57, the collar and sleeve cooperating to hold the piston against a shoulder 47a formed on the plunger. It results that the plunger will move axially in the cylinder in response to fluid pressure admitted thereto on either side of the piston through passages 60 or 61, as the case may be, communicating through pipes 62, 63 respectively with a reversible fluid pressure pump 64 driven by an electric motor 65 or other prime mover.

Plunger 47 is axially bored to form a ram cylinder 70 at the forward end of which passage 51 in the plunger terminates, and the opposite end of this cylinder is provided with a gland 71 surrounding a ram 73 extending into and slidable in the ram cylinder under the influence of a piston 74 reciprocable in an actuating cylinder 75 into which the rear end of the ram extends. The latter cylinder is secured to the head assembly 16 by tie rods 76 and has fluid connections 77, 78 through a suitable differential valve (not shown) with a reversible oil pressure pump 79 driven by a motor 80 whereby reciprocal movements of piston 74 and hence of the ram may be produced.

The testing fluid, usually water, is supplied to passage 51 in plunger 47, at any position of the latter in cylinder 55, through a passage 84 in an extension 85 depending from the plunger and connecting with a bore 86 in a filling ram 87. One end of this ram is provided with a threaded flange 88 secured by cap screws 89 to extension 85, and the ram projects therefrom through a cylinder 90 in the base of head assembly 16, the ends of the cylinder being sealed by glands 92, 93. Radial ports 94, 95 connect the filling ram bore 86 with cylinder 90, while the latter is connected to the water supply (not shown) through a passage 96 and pipe 97 controlled by a valve 98 (Fig. 1), the cylinder 90 and ports 94, 95 thus affording capacity for connection of ram bore 86 and hence passage 51 with the water supply at any position, within limits, of ram 47.

*Operation*

We shall now describe the testing of a pipe P with the aid of the apparatus illustrated in the drawings and further explain the normal functions of the several structural elements thereof.

It will be understood that prior to testing, the pipe is provided with couplings C, C' set up tightly on its ends, and is then positioned in the machine in clamps 17 and the movable head assembly is brought up to enter the couplings in the gland heads 30 and 40 and a fluid tight relation therewith established. The backing-up clamps 31 and 41 are then adjusted to engage the pipe and couplings to prevent the latter from pulling out of the heads. Water under normal main pressure is next admitted to the machine and thence to the pipe by manipulation of valve 98 until the pipe is entirely filled, air escaping meanwhile through exhaust pipe 34 and valve 35 and ram 73 being retracted toward the left in Fig. 3. When water begins to flow out the exhaust pipe, indicating pipe P and ram cylinder 70 are full or substantially so, valves 35 and 98 are closed and oil pressure is exerted in actuating cylinder 75 through operation of motor 80 and pump 79 to drive ram 73 toward the right in Fig. 3 to build up pressure within the pipe to the desired value, the pressure being observed on a suitable gauge (not shown) installed at any convenient point. Assuming the test is to be made under "neutral" condition, the oil pressure in cylinder 55 on opposite sides of piston 58 is suitably controlled to prevent plunger 47 exerting either tension or compression longitudinally of the pipe, oil admitted under pressure through passage 60 and into cylinder 55 being employed to counteract the tension effect of the water pressure in the pipe and also to compensate for any longitudinal shrinkage of the pipe induced thereby. After the pipe has thus been tested, the pressure in it may be relieved through retracting ram 73 and/or opening exhaust valve 35, and the pipe then removed from the bench, but if desired before its removal or in lieu of the "neutral" test just described tests under longitudinal stress, either tension or compression, or under each successively may be made.

For making such tests, either prior to or during the operation of ram 73 the desired longitudinal stress in the pipe is set up by proper control of the oil under pressure supplied to cylinder 55 through passages 60 or 61 as the case may be. Plunger 47, as noted, has one end of the pipe firmly secured to it through clamp 41 while the other end is firmly clamped in the gland head 30 by clamp 31 which prevents longitudinal movement of the pipe with respect thereto; oil pressure in cylinder 55 exerted in either direction against piston 58 therefore tends to force the plunger in a corresponding direction to set up in pipe a longitudinal stress, either of tension or compression, the value of which is determined by the differential of the oil pressures on opposite sides of piston 58. As indicated in the drawing there is usually a clearance X between the ends of the couplings and the respectively adjacent bottoms of the gland cavities receiving them when the opposite ends of the couplings are engaged respectively by the backing-up clamps as shown, and this clearance is usually taken up by operation of plunger 47 during a test under compression, the pipe sliding correspondingly in the clamps, before maximum compression is exerted against the pipe between the gland heads, although when the clamps are tightly set up, especially under relatively mild compression tests, this taking up of these clearances may not occur.

The apparatus constructed in accordance with the invention and herein shown and described can thus be used for making a wide variety of tests, as the internal pressure of the water in the pipe may be raised to any desired value, within limits, by operation of ram 73, and as the effective area of the piston 74 is desirably much larger than that of ram 73, the testing pressure in pipe P is correspondingly greater than that supplied to cylinder 75 through connection 78, which is therefore not required to withstand extremely high pressures. Moreover through the provision of our pressure operated plunger 47 and associated mechanism we can pressure-test the pipe under substantially any condition of longitudinal stress, ranging from a condition of extreme longitudinal tension, through neutral, i. e. a condition of no longitudinal stress, to extreme longitudinal compression, whereby different conditions to which the pipe will be subjected in use can thus be simulated. Thus, for example, the maker can test the pipe to determine its probable serviceability in actual use near the bottom end of a string of oil well casing where it would be under substantial compression, or at the top of the string where it would be under substantial tension, or at any intermediate point in the string where longitudinal stress lies between the extremes occurring at the top and the bottom of the string when in the well, all of which is of great advantage in meeting the increasingly stringent specifications of buyers yet impossible of attainment with any testing machine heretofore, so far as we are aware, available to manufacturers of pipe.

While we have herein shown and described with considerable particularity one embodiment of our invention in which several more or less conventional mechanical elements such as glands, pistons, pumps and the like are employed, it will be understood we do not thereby desire or intend to restrict or confine the invention thereto in any way, as numerous changes and modifications in the specific character of such and other mechanical elements, and in their form, structure, arrangement and relationships to each other and to other parts of the machine will readily occur to those skilled in the art and may be made if desired without departing from the spirit and scope of the invention as defined in the appended claims.

Having thus described our invention, we claim and desire to protect by Letters Patent of the United States:

1. In a machine of the class described, a fixed head assembly comprising a plunger axially movable therein and having a cylindrical cavity, means for moving the plunger axially, pipe receiving and clamping means movable with the plunger, the plunger being provided with a passage interconnecting the cavity and the interior of a pipe when an end thereof is positioned in said pipe receiving and clamping means, a ram reciprocable in said cavity, means for introducing a testing fluid into the cavity and the pipe, control means for reciprocating the ram in the cavity at any position of the plunger in the assembly, means for receiving and clamping the opposite end of a pipe, and means for holding the second mentioned receiving and clamping means in fixed axial relation to said fixed head assembly whereby when the pipe is received in and clamped by each said receiving and clamping means and filled with testing fluid it may be subjected to longitudinal stress by movement of the plunger in the head and to internal fluid pressure by movement of the ram in the cavity.

2. In a machine of the class described, a fixed head assembly comprising a base providing a horizontally disposed cylinder, means for supplying fluid under pressure to opposite ends of the cylinder, a piston reciprocable in the cylinder, a plunger extending oppositely from the piston and reciprocable therewith responsive to said fluid pressure, the plunger having a cavity adapted to receive testing fluid, a reciprocable ram extending into said cavity, control means for reciprocating the ram in the cavity, a gland head carried by the plunger adapted to receive an end of a pipe to be tested and providing a passage interconnecting the cavity and the interior of the pipe and means operable to hold the proximate end of the pipe in fixed axial relation with the gland head and plunger, means comprising a second gland head for holding the other end of the pipe in fixed axial relation with the base, and means operable to confine testing fluid within the plunger cavity, passage and pipe during movement of the ram in the plunger and of the plunger in the base.

3. In a machine of the class described, a fixed head assembly comprising a base providing a horizontally disposed cylinder, means for supplying fluid under pressure to opposite ends of the cylinder, a piston reciprocable in the cylinder, a plunger extending oppositely from the piston and reciprocable therewith responsive to said fluid pressure, the plunger having a cavity adapted to receive testing fluid, a reciprocable ram extending into said cavity, control means for reciprocating the ram in the cavity, a gland head carried by the plunger adapted to receive an end of a pipe to be tested and providing a passage interconnecting the cavity and the interior of the pipe and means operable to hold the proximate end of the pipe in fixed axial relation with the gland head and plunger, means comprising a second gland head for holding the other end of the pipe in fixed axial relation with the base, means for introducing testing fluid into the cavity, passage and pipe, and means operable to confine said fluid therein during displacement of fluid in the cavity by movement of the ram therein whereby fluid pressure is exerted against the interior of the pipe and movement of the plunger in the base is effective to exert longitudinal stress against the pipe as a whole.

4. In a machine of the class described, pipe receiving and clamping means comprising a pair of aligned gland heads respectively adapted to receive the ends of a pipe to be tested, each head having a passage communicating with the pipe when an end thereof is positioned in the head, a movable support for one of the heads comprising a plunger having a cavity communicating with the head, a cylinder supporting the plunger for axial reciprocation, a piston carried by the plunger within the cylinder, means for supplying fluid under pressure to the cylinder selectively on opposite sides of the piston to move the plunger axially therein and thereby exert longitudinal stress on the pipe, a ram reciprocable in the plunger cavity and operable to displace fluid therein, control means operable to reciprocate the ram, and closure means controlling said passages operable to confine testing fluid within the pipe during movement of the ram in one direction whereby through such movement to exert fluid pressure against the interior of the pipe.

5. In a machine of the class described, a pair of aligned head assemblies, one fixed and the other movable, each assembly comprising means adapted to receive, grip and form a fluid-tight joint with the free end of a coupling on the proximate end of a pipe disposed between the heads, the fixed assembly also providing a cylinder coaxial with the pipe, a plunger slidable through the cylinder carrying a piston within the latter and also having an axial cavity and a passage affording communication therefrom with the interior of the pipe, means for maintaining said gripping means on the fixed assembly in axially fixed relation to the end of the plunger proximate the pipe, means operative to selectively exert fluid pressure on either side of said piston thereby to move the plunger axially and place the pipe in tension or compression, a ram extending into said cavity from the outer end of the plunger, fluid controlled means operable to reciprocate the ram, and means for supplying testing fluid to the cavity and interior of the pipe and thereafter confining it therein whereby through subsequent projection of the ram into the cavity the fluid pressure therein and in the pipe may be raised to a desired maximum irrespective of the adjusted positon of the plunger and consequent stress status of the pipe.

6. A machine of the class described comprising a pair of coaxial head assemblies relatively movable to and from each other and each comprising means adapted to receive and clamp the end of a pipe provided with a coupling and to form a fluid-tight joint with the free end of the latter, one of said assemblies also providing a cylinder, a plunger axially slidable in the cylinder secured to the adjacent pipe receiving and clamping means having an axial cylindrical cavity and a passage affording communication from one end of the cavity with the interior of the pipe when positioned in the pipe-receiving means, a ram in said cavity extending beyond the end of the plunger and fluid actuated means operable to reciprocate the ram, means operable to fill the pipe and cavity with testing fluid and confine it therein when the ram is in retracted position whereby through subsequent projection of the ram toward the pipe the fluid pressure therein may be increased to a desired maximum, a piston carried by the plunger for reciprocation in said cylinder, and means for selectively exerting fluid pressure on either side of the piston thereby to move the plunger relatively to the cylinder and, depending on the direction of such movement, place the pipe through said pipe receiving and clamping means and couplings in longitudinal tension or compression independently of the movement of the ram or its relative position with respect to the cylinder.

7. In a machine of the class described, a gland head for receiving an end of a pipe to be tested, a reciprocable plunger supporting the head and providing a cavity communicating with the pipe through the head, a reciprocable ram in the cavity, fluid pressure responsive means for reciprocating the ram, and means for introducing testing fluid into the cavity and pipe comprising an extension on the plunger having a passage communicating with the cylinder and extending in part parallel to the axis thereof, a filling ram carried by the extension including a passage extending in prolongation of said parallel part of the plunger passage and having radial ports adjacent its end remote from the plunger extension, and a filling cylinder having at least one end sealed in part by the filling ram and surrounding said ram adjacent said ports, the filling cylinder having a liquid inlet whereby liquid introduced therethrough can flow into the filling ram passage through said ports and thence into the plunger at substantially any position of the latter.

8. In a machine of the class described, a fixed head assembly providing a substantially horizontal cylinder, a piston slidable therein, a plunger extending through the cylinder, means securing the piston to the plunger, means for admitting fluid under pressure to the cylinder selectively against opposite faces of the piston to reciprocate it in the cylinder, means movable with the plunger for clamping one end of a pipe in fluid-tight fixed relation therewith, the plunger having a cavity communicating with the pipe when in said relation, means for holding the other end of the pipe fixed with relation to said head assembly and also providing a closure for said end, means for introducing testing fluid to the pipe and cavity, a movable ram projecting into the cavity operable to displace the fluid therein to thereby exert pressure against the interior of the pipe, and fluid pressure responsive means fixed to the ram for moving the ram in the cavity independently of movement of the plunger in the assembly.

9. In a machine of the class described, a fixed head assembly providing a substantially horizontal cylinder, a piston slidable therein, a plunger extending through the cylinder, means securing the piston to the plunger, means for admitting fluid under pressure to the cylinder selectively against opposite faces of the piston to reciprocate it in the cylinder, means movable with the plunger for clamping one end of a pipe in fluid-tight fixed relation therewith, the plunger having a cavity communicating with the pipe when in said relation, means for holding the other end of the pipe fixed with relation to said head assembly and also providing a passage communicating with the interior of the pipe, a valve controlling said passage, means communicating with the plunger cavity for supplying testing fluid to the pipe and cavity, a valve controlling said last mentioned means, a ram slidable in the cavity and projecting outwardly therefrom in fluid-tight relation with the walls thereof operable when the pipe and cavity are substantially full of testing fluid and said valves are closed to displace fluid in the cavity and thereby increase the fluid pressure in the pipe, and means for actuating the ram to increase said pressure independently of but concurrently with exertion of longitudinal stress in the pipe in response to fluid pressure in the cylinder against the piston.

JOHN U. DEVINE.
GEORGE T. RADFORD.
MARTIN S. GETTIG.

REFERENCES CITED

The following references are of record in the file of this patent:

UNITED STATES PATENTS

| Number | Name | Date |
| --- | --- | --- |
| 1,613,150 | Zore | Jan. 4, 1927 |
| 1,851,345 | Brown et al. | Mar. 29, 1932 |
| 1,973,674 | Rosenkranz | Sept. 11, 1934 |